(12) United States Patent
Tinoco Cavalheiro et al.

(10) Patent No.: US 8,573,195 B2
(45) Date of Patent: Nov. 5, 2013

(54) SMART DEVICE FOR ABSORBING SOLAR ENERGY AND CONTROLING SUNLIGHT ADMISSION

(75) Inventors: José Roberto Tinoco Cavalheiro, Senhora Da Hora (PT); Márlo Alexandre Sousa Tavares da Fonseca, Porto (PT)

(73) Assignee: Universidade do Porto, Porto (PT)

( * ) Notice: Subject to any disclaimer, the term of this patent is extended or adjusted under 35 U.S.C. 154(b) by 924 days.

(21) Appl. No.: 12/520,026

(22) PCT Filed: Dec. 18, 2007

(86) PCT No.: PCT/IB2007/055201
§ 371 (c)(1),
(2), (4) Date: Jul. 23, 2009

(87) PCT Pub. No.: WO2008/075286
PCT Pub. Date: Jun. 26, 2008

(65) Prior Publication Data
US 2009/0308376 A1    Dec. 17, 2009

(30) Foreign Application Priority Data

Dec. 18, 2006    (PT) .......................................... 103618

(51) Int. Cl.
*F24J 2/40*        (2006.01)
(52) U.S. Cl.
USPC ............ 126/583; 126/588; 126/590; 126/591; 126/618; 126/633; 126/634; 126/640; 126/643; 359/228; 359/886; 52/171.3; 52/202; 52/656.5
(58) Field of Classification Search
USPC ......... 126/583, 571, 610, 611, 612, 621, 628, 126/633, 634, 638, 640, 645, 646, 652, 653, 126/704, 904, 910, 636, 643, 678; 428/34; 52/173 R, 171, 171.3, 172, 787.11, 788, 52/790, 202
See application file for complete search history.

(56) References Cited

U.S. PATENT DOCUMENTS

| 2,631,340 | A | * | 3/1953 | Decker | ............................ 52/202 |
| 3,424,515 | A | * | 1/1969 | Risk | .............................. 359/591 |

(Continued)

FOREIGN PATENT DOCUMENTS

| DE | 3942677 A1 | * | 7/1990 |
| DE | 4127130 A1 | * | 2/1993 |

(Continued)

*Primary Examiner* — Kenneth Rinehart
*Assistant Examiner* — Bao D Nguyen
(74) *Attorney, Agent, or Firm* — Kenealy Vaidya LLP

(57) ABSTRACT

The present invention provides a process for absorbing solar energy and, simultaneously having a continuous control of the light admission making it possible to install the device in external openings of buildings and equipment, such as windows, shutters or skylights. The system comprises two frames which support plates of transparent material, between which it is possible to introduce a colourful solution coming from an external reservoir. Both frames are interconnected through a flexible membrane which allows the plates to be pushed against each other, making the window transparent, or pushed away interposing the colourful solution, which will make the window uniform and gradually translucent or opaque. The said liquid comes from a reservoir and the access to the gap between the plates through is obtained by means of a channel that separates the two frames, allowing the liquid to flow evenly into the whole surface, thus being a homogenous and adjustable darkening obtainable. The inflow or outflow of the liquid between the plates is ruled by the vacuum level inside the reservoir containing the colourful solution. When the window is opaque or partially transparent, the solar energy heats the liquid which is then forced to flow by a circulating pump, passing through a heat exchanger which allows the energy absorption.

13 Claims, 4 Drawing Sheets

(56) References Cited

U.S. PATENT DOCUMENTS

| | | | | |
|---|---|---|---|---|
| 4,027,821 | A | * | 6/1977 | Hayes et al. ............... 126/588 |
| 4,035,608 | A | * | 7/1977 | Stromquist et al. .......... 219/218 |
| 4,036,209 | A | * | 7/1977 | Press ........................... 202/234 |
| 4,093,352 | A | * | 6/1978 | Pisar ............................ 359/886 |
| 4,127,102 | A | * | 11/1978 | Berman ....................... 126/583 |
| 4,207,744 | A | * | 6/1980 | Takeshita et al. ........... 62/235.1 |
| 4,236,360 | A | * | 12/1980 | Parrier et al. ................ 52/171.3 |
| 4,380,994 | A | * | 4/1983 | Seemann ..................... 126/633 |
| 4,532,917 | A | * | 8/1985 | Taff et al. .................... 126/618 |
| 4,561,221 | A | * | 12/1985 | McKee ......................... 52/171.3 |
| 4,674,476 | A | * | 6/1987 | Wilson ......................... 126/591 |
| 5,878,538 | A | * | 3/1999 | Rossini ........................ 52/171.3 |
| 6,216,688 | B1 | * | 4/2001 | Schwarz ...................... 126/633 |
| 6,832,457 | B2 | * | 12/2004 | Geiger ......................... 52/656.5 |
| 6,931,799 | B2 | * | 8/2005 | Webb ........................... 52/167.1 |
| 2007/0251164 | A1 | * | 11/2007 | Egeresi ........................ 52/171.3 |
| 2008/0163570 | A1 | * | 7/2008 | Matoses et al. ............. 52/171.3 |
| 2009/0250053 | A1 | * | 10/2009 | Flaherty ....................... 126/709 |

FOREIGN PATENT DOCUMENTS

| | | | |
|---|---|---|---|
| EP | FR 1379026 (A) | * | 11/1964 |
| EP | 0358807 A1 | * | 9/1988 |
| EP | 0402529 A1 | * | 1/1990 |
| EP | 0445314 A1 | * | 3/1990 |
| FR | 2667349 A1 | * | 4/1992 |
| WO | WO 0012857 A1 | * | 3/2000 |
| WO | WO 0163061 A1 | * | 8/2001 |

* cited by examiner

SMART DEVICE FOR ABSORBING SOLAR ENERGY AND CONTROLING SUNLIGHT ADMISSION

This application is a U.S. national phase filing under 35 U.S.C. §371 of PCT Application No. PCT/IB2007/055201, filed Dec. 18, 2007, and claims priority thereto under 35 U.S.C. §119 to Portuguese patent application no. 103618, filed Dec. 18, 2006, the entireties of both of which are incorporated by reference herein.

FIELD OF THE INVENTION

The present invention relates to a system that simultaneously controls the light admission, replacing shutters and curtains, and solar energy absorption. The system can function either vertically or horizontally, and can be installed in external openings of buildings or other facilities such as windows, shutters or skylights.

BACKGROUND OF THE INVENTION

The research conducted in patents of similar systems shows that the process of interposing a colourful liquid between two transparent surfaces appears in systems that fill up from the bottom but do not allow uniform darkening.

In these systems the window works as a thin tank partially filled with a clear upper area and a dark inferior area. Moreover, as the distance between the two glasses is constant when the liquid is removed phenomena of condensation may occur, which makes visibility difficult.

DE 29809846, DE 4127130, EP 0445314, EP 0402529 e DE 3942677) may be included in this group.

In WO 9206266 (FR 2667349) and FR 1379026 the transparent plates are assembled by an elastic joint whose length allows the glasses to withdraw from each other. In the case of our claimed system, the flexible membrane will only have to make a slight angle between the two extreme positions from transparent to totally opaque. The membrane that assembles the fixed part to the movable one can be strengthened with a textile to support the pressure of the liquid column, which wouldn't be possible according to the systems foreseen in WO 9206266 e FR1379026 that require the elastic deformation of the joint. In spite of the referred alteration which assures a much higher resistance of the flexible joint, the system now claimed, opposite to the description of previous documents, works under a pressure lower than the atmospheric pressure in order to partially compensate the effect of the liquid column and the huge strength exerted on the bottom of the window which otherwise would cause a tremendous bend of the transparent plates even if very thick laminated glasses were used.

The present invention thus solves the problem of the window's height limitation since it allows the compensation of the pressure of the liquid through the vacuum existing in the liquid reservoir. That is not possible in the abovementioned documents, as it is recognised in WO 9206266 that mentions the need of thick glasses (10-12 mm) for a window comprising 2 square meters.

The broad strength exerted by the liquid on the base of the vertical sets would, indeed, block the use of elastic solutions despite being disclosed in WO 9206266 and FR1379026.

The systems designed in WO9206266 and FR1379026 patents were projected as mere ways of controlling of light and not as energy collectors which makes a relevant difference. The system now claimed is intended for collecting solar energy unlike WO 9206266 which tries to avoid heating the liquid using reflective films on the glasses.

Concerning the document CA 2077502 it is shown that this is not a system to collect solar energy once nothing is projected to cool the liquid. This patent foresees a fixed spacing of about 0.5 to 1 mm between glasses, i.e., it doesn't allow a gradual variation of light as the claimed system does.

As in the above referred patents, the system suggested in CA 2077502 will only permit to build windows higher than 50 cm using very thick glass to compensate the pressure of the liquid.

EP 0358807 allows a variable spacing between the glasses through a mechanical process using the manual actuation of eccentric parts that press one of the glasses, showing a very different way of functioning from the claimed system.

WO 2000012857 describes a system of transparent plates at a fixed distance whose space can be filled up with a colourful liquid which expands inside elastic reservoirs. Its conception is incompatible with windows of great dimension due to the pressure exerted by the liquid on the elastic reservoirs which have to be flexible enough to absorb the dilation caused by heating. Likewise progressive and continuous darkening is not possible either.

Among patents of window systems intended for energy absorption, there is WO2001063061 which describes a system where transparent panels are used to cover building facades so that solar energy can heat the colourful fluid between the plates. The system has to continuously allow the light flow since no change in the thickness of the film (or in the composition of the fluid) is admitted. It is, indeed, a system of constant thickness which can neither replace Venetians or blinds nor control the light flow as the systems herein claimed.

U.S. Pat. No. 4,380,994 disclose a system of energy absorption composed by two chambers where a liquid can be inserted. In order to feed the fluid, a chamber placed outside the building will be used to absorb solar energy during summer, dissipating it to the exterior.

In the winter the liquid would be placed in an interior chamber, from where the energy absorbed will be radiated to the inner space of the building, working as a heating system. The system consists of two chambers separated by a fixed space, but it doesn't allow the continuous control of light flow nor will it be able to work during the summer as an energy collector since it is intended to enable energy dissipation avoiding heating the building.

The system disclosed in U.S. Pat. No. 4,561,221 comprises glasses with a fixed distance between each other, wherein a liquid flows aiming to prevent a room temperature rise. This system is therefore destined for energy dissipation and does not allow a control of sunlight admission inside the building.
Electric Systems Many systems of patented intelligent Windows use photochromic or electrochromic effects with electrically conductive ion layers whose working principles are similar to those used in the technology of liquid crystal, electromagnetic processes that act on anisotropic particles, or use working principles of radiation absorption but are unable to collect thermal energy.

The use of solar energy for heating is generally carried out by placing solar collectors on roofs. The system now proposed can function as a skylight to control light intensity, or as a window or even a door. Part of the frame structure and glazing has its traditional role but includes, as well, two other new functions: as a curtain and as energy collector. The claimed system, although more complex than the traditional solutions, offers the possibility to grade the light flow, and turn a room into a completely dark space. There will also be the possibility, if connected to a sensor, to adapt it to the solar variations in order to allow a constant illumination level.

DETAILED DESCRIPTION OF THE INVENTION

Figure 3:
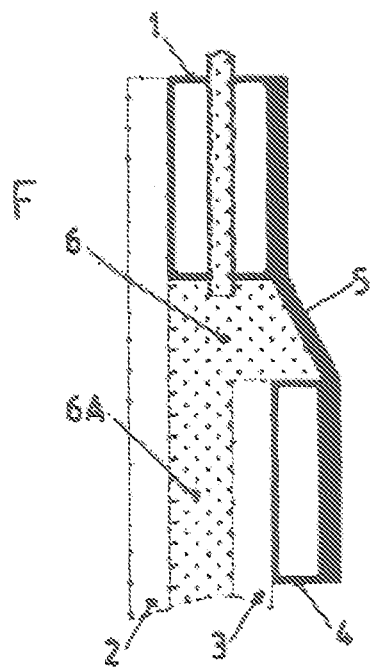
FIG. 3 shows a simplified detail of section A-A' of FIG. 1, showing an example of the window adjusted to stop light—opaque window.
Figure 3:
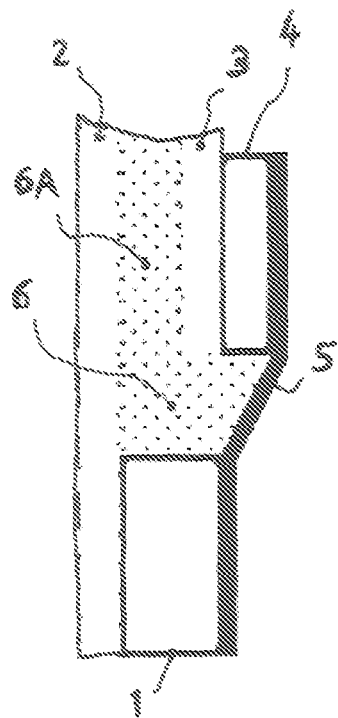

As we can observe in FIG. 3 the fixed outer frame (1) supports the glass or transparent plate (2).

FIG. 3 illustrates a section of the fixed frame (1) and the movable inner frame (4), which is associated with the glass or plate (3). The inner frame (4) is attached to the outer frame (1) by a flexible membrane (5). The attachment of the membrane can be done by means of gluing, vulcanisation or mechanical fixation. The membrane (5) bends in order to change from transparent—FIG. 4 to opaque position—FIG. 3. The membrane (5) has to be stiffened by a canvas to resist to the eventual liquid pressure.

Between the two frames there is a channel (6) that surrounds the inner frame. This channel is always full of liquid.

Figure 1:
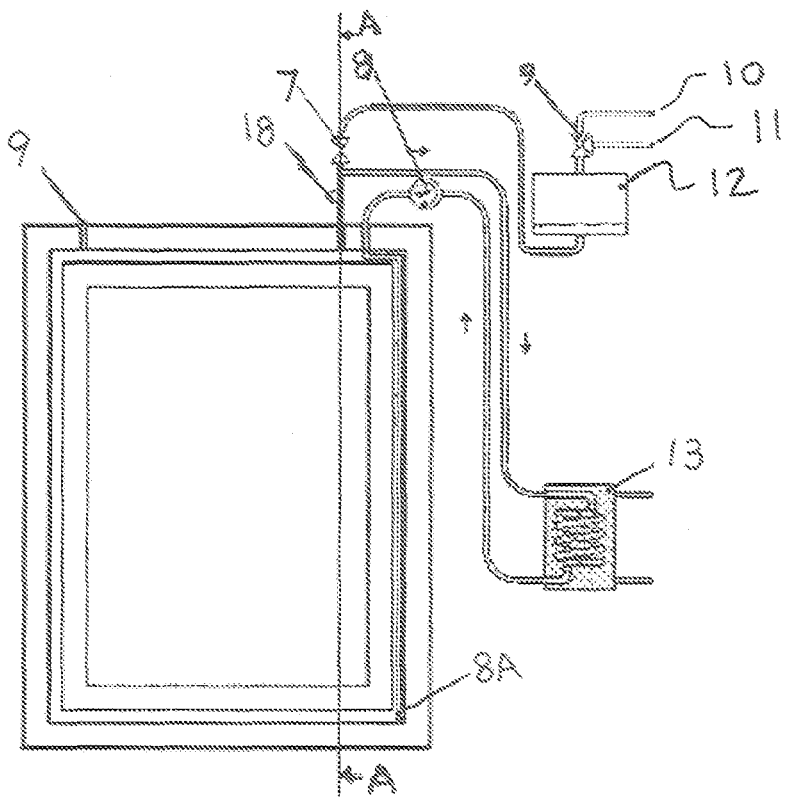
FIG. 1 is a schematic front view of the window and its components, identified below.
Figure 2:
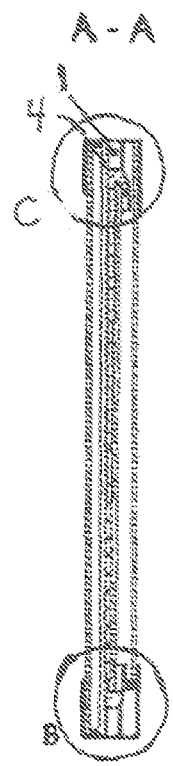
FIG. 2 shows a cross section taken along line A-A'.

In FIG. 1 and FIG. 3, one can observe that the channel (6) is always connected to the reservoir (12) by means of a tube (here shown in the superior section), represented in FIG. 3, which goes through a valve (7). The valve is normally closed.

In the position shown in FIG. 3, the window is opaque because there is a colourful liquid film (6A) between the plates (2) and (3). Depending on the space between the plates, the thickness of the liquid may allow a partial light admission or obstruct it totally, thus regulating the light flow into room.

The regulation of the clear process is done by controlling the valve (7) located in the tube that connects the liquid reservoir (12) to a vacuum system (11). The darkening process is done by controlling simultaneously the valves (7) and (9). The removal of the liquid from the channel (6) into the space between the glasses or transparent plates (6A) (FIG. 3) occurs simultaneously throughout the perimeter of the inner frame, allowing the homogeneous and simultaneous darkening of the whole surface of the window, without bubble formation.

By increasing the vacuum, the liquid that is between the plates is transferred into the reservoir (12), reducing progressively its thickness between the transparent plates.

Figure 4:
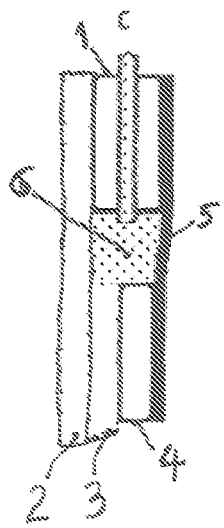
FIG. 4 is a simplified detail of section A-A' of FIG. 1, showing now the window adjusted to allow total transparency.
Figure 4:
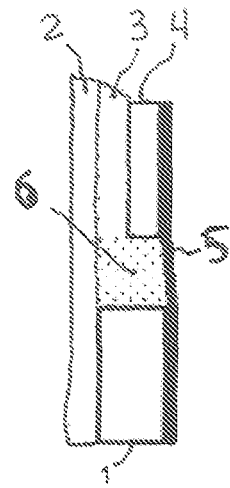

In FIG. 4 the cross section illustrates the window completely transparent, with the two transparent plates (2 and 3), pressed against each other due to the effect of external atmospheric pressure when the valve (7) is opened and the valve (9) is connected to a vacuum system draining the liquid between the plates. In this position, the compression of the plates drains the liquid, thus, ensuring the total transparency of the window.

In order to turn the window dark, the air gets in the reservoir (12) through the tube (10) actuating the valve (9) and opening of the valve (7) that is connected to the window, which allows the laminar flow of the liquid film (6A) into the window in a gradual and even way through the channel (6) which surrounds the inner frame (FIG. 3). In order to turn the window totally or partially transparent, the valves (9 and 7) are activated simultaneously to connect the window to the vacuum system (11).

In vertical windows, which work in a partial or total opaque position, the vacuum level inside the channel (6) is kept in order to compensate the pressure of the liquid column inside the window. The lowest vacuum level is guaranteed by a sensor (18) that controls the valves (7 and 9). This sensor also avoids the pressure increase inside the window, resulting from abnormal heating or for any other reason.

When the window is in its partial or total opaque position and exposed to the sunlight, in case of a long-term energy failure and consequent heating of the liquid, the safety valve (19) allows the partial drainage of the liquid thus limiting the pressure between the plates to avoid damaging the structure.

Energy Absorption

When there is liquid between the plates, the solar energy is absorbed. This happens whenever the window is translucent or opaque.

The energy absorbed would cause a huge temperature rise if the liquid remained stationary between the plates. In this case the circulation pump (8)—FIG. 1 starts working, activated by a sensor, not illustrated, which functions whenever the glasses are separated due to the presence of the liquid. The circulation pump enables both the window to cool and the thermal energy to be absorbed making the liquid move through the heat exchanger (13). The heat exchanger can be installed inside a reservoir of water heating.

The pump can be switched off whenever necessary, for instance, during the night, when the window, in its opaque position, insulates the room acting as a Venetian blind.

After cooling in the heat exchanger (13), the colourful liquid flows back to the bottom of the window through the pipe (8 A) placed inside the channel (6).

To maximize the capacity of the system, should it be designed to absorb solar energy, it is necessary to increase its thermal insulation. We will now describe the whole system as it was not fully illustrated in FIGS. 3 and 4.

Figure 5:
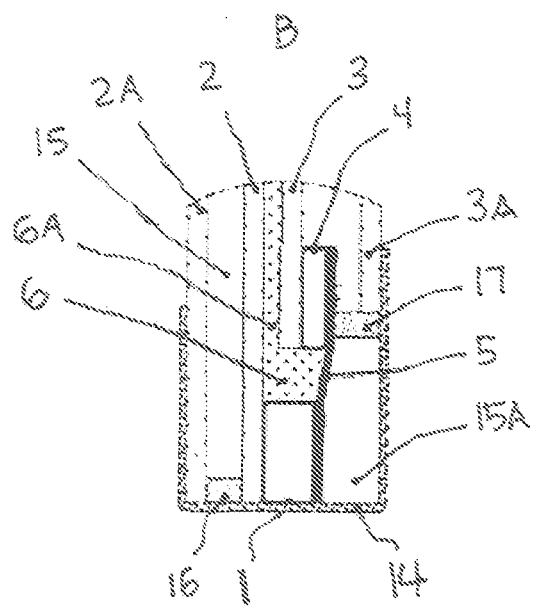
FIGS. 5 and 6 illustrate in section A-A' a detail of the overall assembly, on a complete version with four glasses, where in FIG. 5 the window is in its opaque position while in FIG. 6 in its transparent position.
Figure 6:
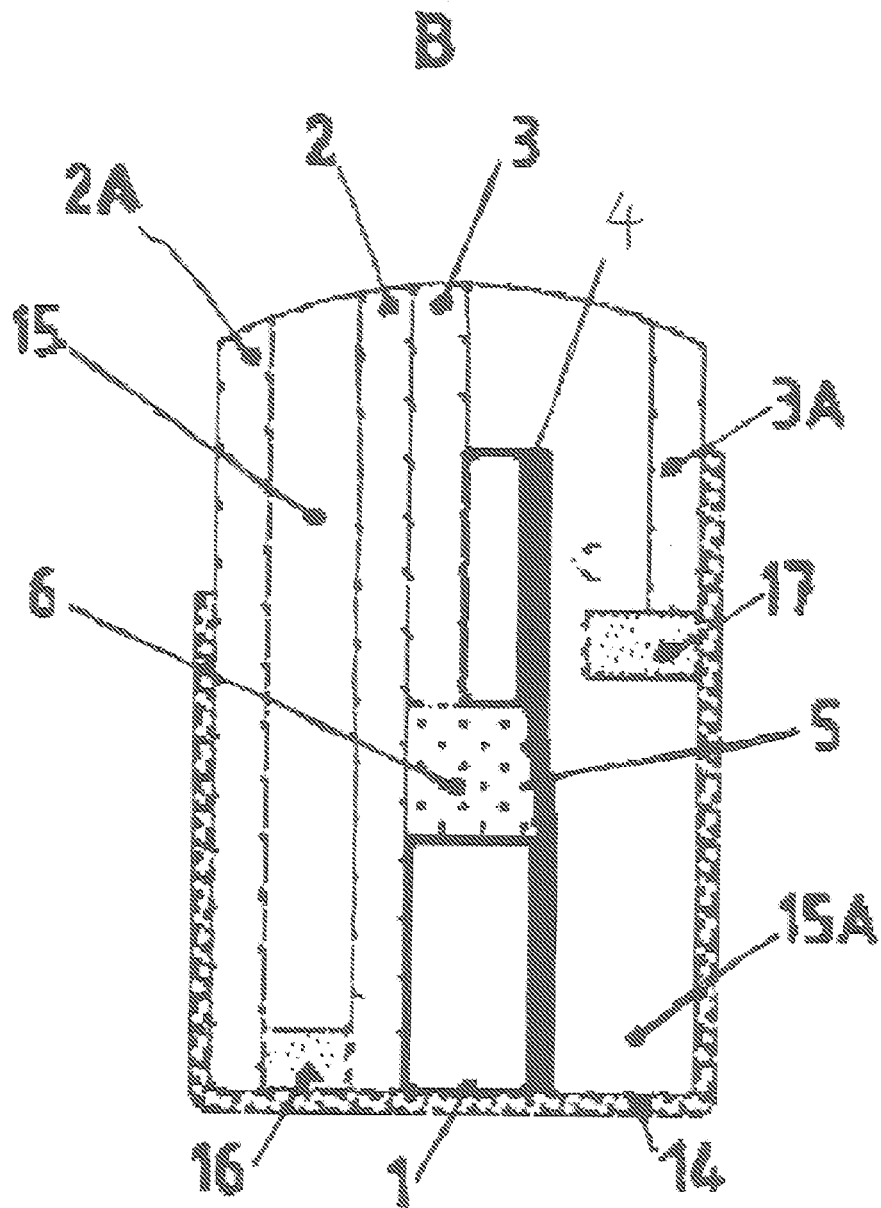

As shown in FIGS. 5 and 6, for solar energy absorption, the set of fixed (1) and moving (4) frames is wrapped by a fixed hoop (14): this hoop contains 2 glasses of insulation (2A and 3A) that create insulation chambers (15 and 15A). These chambers increase the energy efficiency and improve the heat and sound insulation of the window.

The chamber (15) has a constant pitch between the transparent plates (2) and (2A), which matches the size of spacer (16).

The size of the chamber (15A) may vary when the window changes from transparent to opaque. The optional spacer (17), placed between the bottom of frame (4) and the fixed hoop (14) in the bottom of the window allows fixing the gap between the glasses (2) and (3). With this option, it is possible to obtain a 'degradé' effect, where the window becomes progressively opaque on top and still transparent on the bottom.

If the system must work as a heat exchanger, for instance when connected to a heat pump, the external chamber (15) can be suppressed to provide the energy transfer with the environment (air, rain).

Embodiment

The frames can be made of metal, or any other resistant material. The plates or glasses (2) and (3) must be resistant enough to support the pressure resulting from the liquid column (If the plates are made of glass, a safety laminated glass must be used on vertical windows). The plates must be glued or fixed to the frames allowing a tight solution. The flexible membrane can be fixed to the frames by means of glue, vulcanization or mechanical fixation.

The concentration of the colourful solution must allow a total opacity with a small thickness of liquid, only a few millimeters. The liquid must be mixed with anti-algae, anti-fungus, surfactant products and anti-freeze compounds.

If the window is high, the pressure inside the channel (6) must be lower than atmospheric pressure, to allow the compensation of the liquid column pressure which could destroy the system. In these situations the minimum vacuum level will be established using the sensor (18) placed in the liquid inlet, which commands the vacuum level. The liquid volume to be transferred is very small, even when the window changes from complete opacity to total transparency. The vacuum line only needs a small compressor.

When solar heating of the liquid originates an increase in the pressure inside the closed circuit that crosses the heat exchanger (13), the sensor (18) actuates the vacuum system (valves (9) and (7)), allowing the adjustment of pressure, avoiding problems in the system.

In order to assure the system's safety, in case of power failure, the valve (7) remains closed, except during the filling process (air inlet through pipe (10)) or air outlet through connection (11) determined by the actuation of valve (9). So being, an accidental and uncontrolled filling of the window is avoided.

When the system is working as a movable window or door, the connection pipes will be flexible.

To avoid a darkening from bottom to top, an optional spacer (17) can be used to limit the bottom gap between the glasses and to allow a 'degradé' effect, with a decreasing opacity from top to bottom.

Implementation

Without intending to limit the scope of the invention some possibilities of implementation will be described hereinafter.

As Skylight

When the system is used as a horizontal or nearly horizontal glass-roof, there are no dimensional limitations besides those common in skylight installations. The liquid column on horizontal glass-roof is only a few millimeters thick, which allows the use of a light internal frame.

On horizontal glazing, when the energy recovery is not relevant (sport zones, commercial zones), the system can be simplified using mainly two glasses, i.e. eliminating chambers (15) and (15A) and the glasses (2A) and (3A). The heat exchanger can be connected to a cooling equipment allowing the partial substitution of the traditional air-conditioning solutions.

Another embodiment allows the use of a cooled liquid in a transparent roof covering thus enabling a homogeneous cooling of the space without draught problems.

The system can also be used in public spaces as a skylight, providing light admission control and heated water for domestic purposes or swimming pools and so on. The use of a light sensor provides an automatic adjustment of indoor luminosity.

As Window

Applied as a window or door, the system can not only recover energy from the outside, but also avoid the use of shutters and curtains. Using four glass plates or any other material and two insulating chambers, a high thermal and acoustic insulation is achieved.

During the season of greatest insulation, the system can avoid heating the building while recovering energy used to heat water. During the night, the darkening capacity avoids the use of Venetian blinds.

The connection to a light sensor can provide a constant level of luminosity, adjusting the opacity to the solar variations in working spaces. In hotels, very expensive opaque curtains can be suppressed, and the system connected to an alarm clock can provide a 'natural' awake-up.

The use of independent modules allows the construction of large glazed surfaces, making use of a single and cheap compressor connected to small deposits.

Flexible pipes can be used in mobile systems.

The system can be used as a thermal exchanger connected to a heating pump. Suppressing the external glass 2A and consequently the insulating chamber 15, the system can provide a large surface of contact with the external atmosphere, providing heat transfer with air or rain water.

The substitution of the water direct heating function by an electrical heating pump can provide the possibility of the system now work with or without solar exposition, including during night, all the year except with very cold conditions. On this version the efficiency on summer will decrease, but the device could be useful all the year providing an increase of heating efficiency of the building inclusively during night.

The coefficient of performance of the electric heat pump connected to the window, now working as a heat exchanger, will be greater than 1, i.e. one kilowatt of electricity can provide more than one kilowatt of heating power.

Another possibility is the use of the system to produce cold inside the building; this can be achieved with a three window system, now with the external chamber 15 but without the internal glass 3A, consequently without the internal insulating chamber 15A. The heating pump can heat domestic water and simultaneous the discharge side of its compressor can cool the liquid, providing a cold surface glass (3) to cool the interior of the building.

The present description of the smart device used to absorb energy and control sunlight admission is only a non-limitative example which can be modified by a person skilled in the art, being however covered by the scope of the invention, as defined by the following claims.

The invention claimed is:

1. A smart device for absorbing solar energy and controlling sunlight admission comprising:
   a pair of transparent plates;
   a fixed outer frame supporting the transparent plates, configured to be mounted on an outside of a building;
   a moving inner frame supporting the transparent plates being an inner frame attached to the fixed outer frame by a flexible membrane, the inner frame configured to be placed inside the building;
   a channel surrounding the inner frame and which is filled with a liquid;
   a reservoir connected to the channel by means of a tube that goes through a retaining valve which allows under vacuum a compensation of a liquid column pressure on a base of the transparent plates and;
   a valve which allows changing thickness of the liquid, thus regulating sunlight admission, the valve being installed in a tube that connects a liquid reservoir to a vacuum system, and the valve provides a connection between the reservoir and the channel;
   a circulation pump, activated by a switch, that functions when the transparent plates are spaced apart by the liquid, ensuring a cooling process and thermal energy absorption for the window and making the liquid circulate through a heat exchanger;

wherein a darkening regulation is carried out simultaneously by valve control which enables air flow into the reservoir through the tube and through the valve which allows a laminar flow of the liquid between the transparent plates, and wherein liquid removal from the channel into a gap between the transparent plates, whose distance is variable and/or adjustable, is made simultaneously through a perimeter of the inner frame.

2. The smart device for absorbing solar energy and controlling sunlight admission according to claim 1, wherein the liquid, after cooling inside the exchanger, flows back to the bottom of the window through a second tube, located inside the channel.

3. The smart device for absorbing solar energy and controlling sunlight admission according to claim 1, wherein the vacuum level inside the channel is ensured by a sensor which actuates the valve in order to compensate the pressure of the liquid column inside the window.

4. The smart device for absorbing solar energy and controlling sunlight admission according to claim 1, wherein the membrane is reinforced with a film in order to resist to the pressure of the liquid column.

5. The smart device for absorbing solar energy and controlling sunlight admission according to claim 1, further comprising a safety-valve which allows the partial discharge of the liquid and avoids the increase of pressure between the transparent plates in case of a long-term power failure and subsequent liquid warming.

6. The smart device for absorbing solar energy and controlling sunlight admission according to claim 1, wherein the fixed outer frame and the moving inner frame are evolved by a fixed hoop which supports two insulating glasses, which allow the creation of two insulating chambers, wherein one of the chambers has a constant thickness between the plates being defined by the dimension of a spacer; and wherein another of the chambers can change its dimension depending on the window's opacity or transparency.

7. The smart device for absorbing solar energy and controlling sunlight admission according to claim 6, further comprising an optional spacer, placed between the bottom of the moving inner frame and the fixed hoop placed on the window's bottom allowing a settlement of the distance between the transparent plates.

8. The smart device for absorbing solar energy and controlling sunlight admission according to claim 1, wherein the liquid located in the gap between the transparent plates contains anti-fungus, anti-algae, surfactant and anti-freeze products.

9. The smart device for absorbing solar energy and controlling sunlight admission according to claim 1, wherein the device is able to function on vertical or horizontal positions and be inserted in external equipment or building openings, such as windows, doorways, skylights and be used in vehicles.

10. The smart device for absorbing solar energy and controlling sunlight admission according to claim 1, wherein the sensor is dispensable and consequently the pressure of liquid column automatic control, when the system works on horizontal or on vertical positions with a high less than 50 cm.

11. The smart device for absorbing solar energy and controlling sunlight admission according to claim 1, wherein the device can be used simultaneously as a light controller and air cooling device by substituting the heat exchanger with a refrigeration device.

12. The smart device for absorbing solar energy and controlling sunlight admission according to claim 1, wherein the liquid is a colored liquid.

13. The smart device for absorbing solar energy and controlling sunlight admission according to claim 1, wherein the transparent plates are glass plates.

* * * * *

UNITED STATES PATENT AND TRADEMARK OFFICE
CERTIFICATE OF CORRECTION

PATENT NO.          : 8,573,195 B2  
APPLICATION NO.  : 12/520026  
DATED                   : November 5, 2013  
INVENTOR(S)         : Tinoco Cavalheiro et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1052 days.

Signed and Sealed this

Twenty-second Day of September, 2015

Michelle K. Lee
*Director of the United States Patent and Trademark Office*